United States Patent [19]

Dawson et al.

[11] Patent Number: 5,070,449

[45] Date of Patent: Dec. 3, 1991

[54] BUS INTERFACE CONTROLLER FOR COMPUTER GRAPHICS

[75] Inventors: John F. Dawson, Albuquerque; Glenn M. Courtright, Rio Rancho; Douglas A. Fischer, Albuquerque, all of N. Mex.

[73] Assignee: Honeywell Inc., Minneapolis, Minn.

[21] Appl. No.: 287,100

[22] Filed: Dec. 19, 1988

[51] Int. Cl.[5] .............................................. G06F 13/00
[52] U.S. Cl. .................................. 395/325; 364/240.7; 364/942; 340/825.03; 340/825.89; 364/DIG. 1; 364/DIG. 2
[58] Field of Search ......................... 364/200, 900; 340/825.79, 825.85, 825.89, 825.03; 328/76, 154; 307/475, 480; 370/53

[56] References Cited

U.S. PATENT DOCUMENTS

| | | | |
|---|---|---|---|
| 4,214,213 | 7/1980 | Ferrie | 328/117 |
| 4,471,456 | 9/1984 | Branigin et al. | 364/900 |
| 4,717,912 | 1/1988 | Harvey et al. | 340/825.83 |
| 4,761,647 | 8/1988 | Hallenbeck et al. | 340/825.22 |
| 4,787,064 | 11/1988 | Wagner | 364/900 |
| 4,852,083 | 7/1989 | Niehaus et al. | 378/58 |

OTHER PUBLICATIONS

Texas Instruments, SN74AS8840, Digital Crossbar Switch, (see U.S. Pat. No. 4,852,083 above) Specification.
Advanced Micro Devices (AMD), AM29C983 9-Bit × 4-Part Multiple Bus Exchange Specification.

Primary Examiner—Michael R. Fleming
Assistant Examiner—Glenn A. Auve
Attorney, Agent, or Firm—Ronald E. Champion; Roger W. Jensen; George A. Leone, Sr.

[57] ABSTRACT

A bus interface controller for use in a digital information system. The bus interface comprises more than four bi-directional data channels which are multiplexed so as to accomplish switching of data from any channel to any or all of the remaining channels. The device is preferably embedded in a substate comprising gallium arsenide material and operates at a frequency of at least 25 MHz.

4 Claims, 1 Drawing Sheet

BUS INTERFACE CONTROLLER FOR COMPUTER GRAPHICS

BACKGROUND OF THE INVENTION

I. Field of the Invention

The invention is directed generally to the field of digital information systems and, more particularly, to a bus interface controller apparatus for use in computer graphics systems.

II. Discussion of the Prior Art

Many graphics, communications, and DSP applications require a large amount of information processing, most of which is passed through some form of high speed memory. Manufacturers of such memory devices have made dramatic improvements in the areas of speed and density over the past few years. In applications that require multiple bus access into and out of such dense high speed memory products, an increasingly high portion of the surface area available on a printed circuit board and an increasingly higher percentage of the available bandwidth of a typical system is being consumed by the semi-conductor devices which interface with such memory devices. The invention provides a design for use as a memory interface which reduces the number of parts required in many applications and can be universally adapted to many applications.

Some examples of known memory interface chips include the 373/374 latch or 244/245 buffer/transceiver. Texas Instruments, Inc. has produced a crossbar switch Model No. 74AS8840 which includes 64 I/O pins arranged in 16 4-bit groups, where each group of four pins serves as a bi-directional input to an output from a 4-bit multiplexer. Also available are devices such as AMD Company's Model No. Am29C98 which is a 9-bit by four port multiple bus exchange device. Typical port-to-port delays for such devices are in the 9 to 10 nanosecond range. Such devices also require a large amount of external user-supplied control logic relative to the interface device of the invention. Speeds in the 9 to 10 nanosecond range are too slow for many current applications requiring high speed processing, such as graphic display systems. The invention has advantages over the known devices of the prior art including internal latching buffering architecture which is user configurable, via output configuration control lines. Through the use of the gallium arsenide (GaAs) technology for fabrication of the design, the invention provides the speed necessary with TTL/CMOS compatible inputs and outputs.

SUMMARY OF THE INVENTION

A bus interface controller for use in a digital information system having a system clock is disclosed. The bus interface controller comprises more than four data channels of more than nine bits per channel which feed into apparatus for multiplexing the data channels bi-directionally so as to accomplish routing of data from any channel to any or all of the remaining channels.

It is one object of the invention to provide a bus interface controller having bi-directional I/O ports which alleviates board area and system bandwidth problems associated with prior art devices.

It is another object of the invention to provide a memory interface universally adaptable to many configurations in many digital systems, such as high speed graphics display systems.

It is yet another object of the invention to provide a device which may be embedded in a semiconductor material, such as gallium arsenide.

It is yet another object of the invention to provide a memory interface having bi-directional buses with less than a four nanosecond propagation delay through the system.

It is yet another object of the invention to provide a memory interface device having TTL/CMOS compatible inputs and outputs.

It is yet another object of the invention to provide a memory interface device having multiplexible buses.

These and further objects, advantages and features of the invention will become apparent through the drawings herein wherein like numerals refer to like elements and through the claims and description of the preferred embodiments contained herein.

DESCRIPTION OF THE PREFERRED EMBODIMENT

Figure 1:
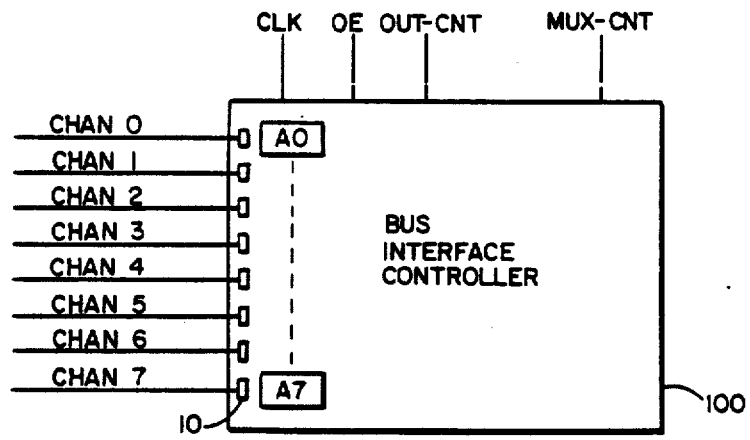
FIG. 1 shows a block diagram of an illustrative example of the bus interface controller device of the invention having a clock line, eight output control lines (Out-Cnt), eight output enable lines (OE), and twenty-four multiplexer control lines (Mux-Cnt) as well as eight 16-bit data channels Chan 0–Chan 7.

FIG. 1 shows a block diagram of an illustrative example of the bus interface controller device of the invention 100. The device 100 has a plurality of input/output (I/O) ports including channels Chan 0 through Chan 7. These channels are, in one example of the device, 16-bit bi-directional bus lines. Also included are user configurable control inputs including the clock input (CLK), the output enable input (OE), the output control input (Out-Cnt) and the multiplexer control input (MUX-CNT). Typically, input CLK will be a single line routed throughout the chip carrying the clocking signal. Also included in bus interface controller 100 are eight identically replicated circuits, one for each of the eight channels in this example. If more or less channels are used, the replicated circuits will vary accordingly. These circuits are discussed in more detail below with reference to FIG. 2.

The OE line and Out-Cnt lines are each 8-bits wide and used for controlling each of the eight replicated circuits within the bus interface controller. The MUX-CNT lines are advantageously 24-bits wide, using 3 bits to control each of 8 multiplexer circuits as contained within the replicated circuits A0 through A7.

Figure 2:
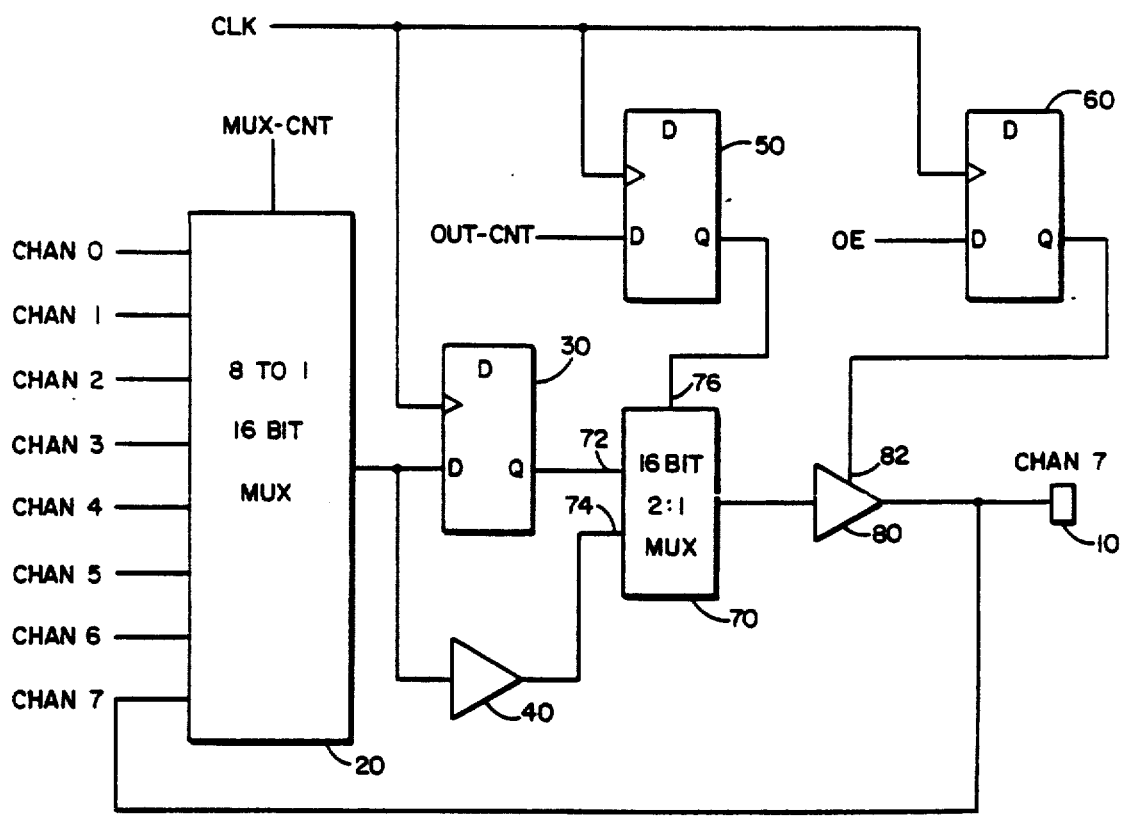
FIG. 2 shows a detailed design of an illustrative embodiment of the bus interface controller chip of the invention.

FIG. 2 shows a functional block diagram of an illustrative embodiment of the invention. Those skilled in the art will recognize that the invention can be accomplished in many alternative forms and the embodiment shown in FIG. 2 is meant to serve as an example for the purposes of describing the invention and does not limit the invention to the embodiment shown. As indicated above, the bus interface controller of the invention comprises a circuit as shown in FIG. 2 replicated into identical circuits A0–A7 for each channel. The example shown in FIG. 2 is the circuit block for Chan 7 including I/O port 10 for Chan 7 which feeds back to the channel 7 input of multiplexer 20. A similar block exists within the bus interface controller chip for each of the remaining channels 0 through 6. So that, for example, the circuit block A6 for chan 6 will have the I/O port for Chan 6 fed back into the Chan 6 input for the A6 multiplexer and the other channels will be cross-fed into Chan 6 through their designated multiplexer inputs. Similarly, there is a circuit, as shown in FIG. 2, corresponding to each of the channels used by the bus interface controller of the invention wherein the only variable is the channel designation for the I/O port. In the embodiment shown in FIG. 2, there are eight channels, Chan 0 through Chan 7. Those skilled in the art will recognize that the number of channels may vary.

Still describing the embodiment shown in FIG. 2, a first latch or flip-flop 30 is shown having a clock input and a D-input connected to the output of the multiplexer 20. Flip-flop 30 has a Q-output. Buffer 40 is also connected to the output of the multiplexer 20 and the D-input of flip-flop 30. A second flip-flop 50 also has a clocking input and an output control input (Out-Cnt) and a Q-output. A third flip-flop 60 has an output enable input (OE), a clocking input and a Q-output. The apparatus of the invention further comprises a second multiplexer having first and second inputs and an output and a control input 70. The first input 72 is connected to the Q-output of flip-flop 30. The second input 74 is connected to the output of buffer 40. The second latch 50 has its output connected to the control input of the multiplexer 70 at 76. The output of multiplexer 70 is connected to the input of buffer 80. Buffer 80 has a control input 82 connected to the output of latch 60. Finally, the output of buffer 80 is connected to the input 10 of channel 7 which is further fedback to the channel input of the first multiplexer 20. Multiplexer 20 has a control input MUX-CNT which is preferably a 3-bit control line for a 16-bit, eight channel device as shown in FIG. 2 by way of illustration and not by way of limitation.

Also by way of illustration, and not limitation, the design of the invention may be embodied in a semi-conductor material preferably comprised of gallium arsenide. In one embodiment of the invention, a bus interface controller comprised of eight 16-bit, bi-directional buses will have a power dissipation of less than 500 milliwatts. Such a system will operate at 26 MHz and above with less than a four nanosecond propagation delay. The output drives of such a system will preferably be in the range of six to eight milliamps. Inputs and outputs will be TTL/CMOS compatible with tri-state outputs. The latch/buffer architecture can be user-configurable.

Having described the physical embodiment of the invention in detail, we now turn to a an example for purposes of describing the operation of one embodiment of the invention as shown in FIG. 2.

In operation, data may be introduced onto channels Chan 0 through Chan 7 through the I/O ports such as input 10 as shown in FIG. 2. The multiplexer 20 for each channel selects the data to be throughput in accordance with the 3-bit control signal on line MUX-CNT. For example, if the bits appearing on MUX-CNT during a control cycle read "001", channel 1 would be switched onto the output of multiplexer 20.

The latches 30, 50 and 60 together with multiplexer 70 determine which direction the data is flowing, in or out. If latch 60 receives an output enable signal, it is passed on the next control clock cycle to enable data to flow through buffer 80. If buffer 80 is disabled through the operation of flip-flop 60, data can flow into the channel, in this case, channel 7, from elsewhere in the digital system, such as a user input. Similarly, multiplexer 70 is controlled by latch 50 and determines whether data will flow into the I/O port 10 through latch 30 or through buffer 40 from multiplexer 20. Each of the channels operates in a similar manner.

This invention has been described herein in considerable detail in order to comply with the Patent Statues and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A bus multiplexer having a plurality of multi-bit channels, a clock signal, a mux-control signal, an output enable signal, and an out-count signal, the bus multiplexer comprising:

(a) a first multiplexer means for selecting any one of the multi-bit channels wherein the first multiplexer means has a plurality of multi-bit channel inputs wherein each multi-bit channel input is connected to a separate one of the multi-bit channels, a first select input connected to the mux-control signal and a first mux output channel, wherein the first multiplexer means selects a multi-bit channel in response to the mux-control signal;

(b) a first data latching means for latching the first mux output channel having a first clock enable signal input connected to the clock signal, a first channel input connected to the first mux output channel, and wherein the first data latching means further comprises a first data output channel;

(c) a second data latching means for latching the out-count signal having a second clock enable input connected to the clock signal, a second data input connected to the out-count signal, and wherein the second data latching means further comprises a first data output signal;

(d) a third data latching means for latching the output enable signal having a third clock enable input connected to the clock signal, a third data input connected to the output enable signal, and wherein the third data latching means further comprises a second data output signal;

(e) a first buffer means for transmitting a channel connected to the first mux output channel having a first buffer output channel;

(f) a second multiplexer means for selecting a multiplexed multi-bit channel having a second select input connected to the first data output signal, a latched channel input connected to the first data output channel, and a buffered channel input connected to the first buffer output channel, wherein the second multiplexer further comprises a second mux output channel wherein the multiplexed multi-bit channel is selected in response to the first data output signal; and (g) a second buffer means for gating a signal having a transmit control connected to the second data output signal with a second buffer input connected to the second mux output channel, the second buffer means having a second buffer output connected to any one of the plurality of multi-bit channels.

2. The apparatus of claim 1 wherein:
(a) the first multiplexer means is an 8 to 1 encoder;
(b) the second multiplexer means is a 2 to 1 encoder;
(c) the first data latching means and second data latching means further comprise D flip-flop circuits;
(d) the apparatus is embedded in a semiconductor material comprising gallium arsenide;
(e) the multi-bit channels include tri-state outputs;
(f) the clock signal frequency is at least 25 megahertz; and
(g) the multi-bit channels are TTL/CMOS compatible.

3. A bus interface controller for use in a digital information system having a plurality of multi-bit channels, a clock control signal, an output enable signal, an out-count signal and a mux-control signal wherein the bus interface controller comprises:

(a) a plurality of bus multiplexers, each bus multiplexer comprising:

(i) a first multiplexer means for selecting any one of the multi-bit channels wherein the first multiplexer means has a plurality of multi-bit channel inputs wherein each multi-bit channel input is connected to a separate one of the multi-bit channels, a first select input connected to the mux-control signal, and a first mux output channel, wherein the first multiplexer means selects a multi-bit channel in response to the mux-control signal;

(ii) a first data latching means for latching the first mux output channel having a first clock enable signal input connected to the clock signal, a first channel input connected to the first mux output channel, and wherein the first data latching means further comprises a first data output channel;

(iii) a second data latching means for latching the out-count signal having a second clock enable input connected to the clock signal, a second data input connected to the out-count signal, and wherein the second data latching means further comprises a first data output signal;

(iv) a third data latching means for latching the output enable signal having a third clock enable input connected to the clock signal, a third data input connected to the output enable signal, and wherein the third data latching means further comprises a second data output signal;

(v) a first buffer means for transmitting a channel connected to the first mux output channel having a first buffer output channel;

(vi) a second multiplexer means for selecting a multiplexed multi-bit channel having a second select input connected to the first data output signal, a latched channel input connected to the first data output channel, and a buffered channel input connected to the first buffer output channel, wherein the second multiplexer further comprises a second mux output channel wherein the multiplexed multi-bit channel is selected in response to the first data output signal; and (vii) a second buffer means for gating a signal having a transmit control connected to the second data output signal with a second buffer input connected to the second mux output channel, the second buffer means having a second buffer output connected to any one of the plurality of multi-bit channels.

4. The apparatus of claim 3 wherein:
(a) the first multiplexer means is an 8 to 1 encoder;
(b) the second multiplexer means is a 2 to 1 encoder;
(c) the first data latching means and second data latching means comprise D flip-flop circuits;
(d) the apparatus is embedded in a semiconductor material comprising gallium arsenide;
(e) the multi-bit channels include tri-state outputs;
(f) the clock signal frequency is at least 25 megahertz; and
(g) the multi-bit channels are TTL/CMOS compatible.

* * * * *